(12) United States Patent
Iwasaki et al.

(10) Patent No.: US 9,845,871 B2
(45) Date of Patent: Dec. 19, 2017

(54) AUTOMATIC TRANSMISSION

(71) Applicant: Mazda Motor Corporation, Aki-gun, Hiroshima (JP)

(72) Inventors: Tatsuhiko Iwasaki, Hiroshima (JP); Shinya Kamada, Kure (JP); Yasuhiro Ogauchi, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 14/677,323

(22) Filed: Apr. 2, 2015

(65) Prior Publication Data

US 2015/0300490 A1    Oct. 22, 2015

(30) Foreign Application Priority Data

Apr. 17, 2014  (JP) .................... 2014-085788

(51) Int. Cl.
*F16H 63/30*      (2006.01)
*F16H 3/66*       (2006.01)
(Continued)

(52) U.S. Cl.
CPC ........... *F16H 63/3026* (2013.01); *F16H 3/66* (2013.01); *F16H 61/686* (2013.01); *F16H 2003/442* (2013.01); *F16H 2200/006* (2013.01); *F16H 2200/2012* (2013.01); *F16H 2200/2043* (2013.01); *F16H 2200/2082* (2013.01)

(58) Field of Classification Search
CPC .......... F16H 3/66; F16D 25/06; F16D 25/062; F16D 25/063; F16D 25/0635; F16D 25/0638; F16D 25/10
See application file for complete search history.

(56) References Cited

U.S. PATENT DOCUMENTS 3,858,698 A * 1/1975 Hause ................. F16D 25/0638
                                                                188/216
4,741,422 A   5/1988 Fuehrer et al.
(Continued)

FOREIGN PATENT DOCUMENTS

JP   H0341242 U    4/1991
JP   H07269665 A   10/1995
(Continued)

*Primary Examiner* — Ramya Burgess
*Assistant Examiner* — David Morris
(74) *Attorney, Agent, or Firm* — Alleman Hall Creasman & Tuttle LLP

(57) ABSTRACT

An automatic transmission is provided. The transmission includes clutches coaxially arranged in layers in a radial direction of the transmission. The transmission includes a piston provided to each clutch, the pistons being aligned in the radial direction on a same plane perpendicular to an axis of the transmission, without overlapping with each other in an axial view. The transmission includes a common rotational member having a wall, commonly used for the clutches, and disposed at a predetermined position of the transmission in an axial direction, wherein the wall is formed along the plane. The transmission includes operational hydraulic passages parallely arranged in the wall of the common rotational member in a circumferential direction of the transmission on the same plane perpendicular to the axis, each of the operational hydraulic passages communicating with one of operational hydraulic chambers of the respective clutches.

6 Claims, 11 Drawing Sheets

(51) Int. Cl.
    *F16H 61/686*     (2006.01)
    *F16H 3/44*     (2006.01)

(56) References Cited

U.S. PATENT DOCUMENTS

| | | | | |
|---|---|---|---|---|
| 7,001,301 | B2* | 2/2006 | Wittkopp | F16D 25/10 |
| | | | | 475/146 |
| 7,070,532 | B2* | 7/2006 | Stevenson | F16D 25/082 |
| | | | | 192/48.606 |
| 8,454,468 | B2* | 6/2013 | Janson | F16D 25/083 |
| | | | | 192/48.603 |
| 8,534,437 | B2* | 9/2013 | Wilton | F16D 25/0638 |
| | | | | 192/106 F |
| 8,794,412 | B2* | 8/2014 | Kasuya | F16D 13/683 |
| | | | | 192/106 F |
| 9,222,550 | B2* | 12/2015 | Janson | F16H 3/66 |
| 2003/0051965 | A1* | 3/2003 | Hirt | F16D 23/12 |
| | | | | 192/52.1 |
| 2005/0090352 | A1* | 4/2005 | Armstrong | F16H 3/66 |
| | | | | 475/114 |
| 2014/0371023 | A1* | 12/2014 | Janson | F16H 3/66 |
| | | | | 475/275 |

FOREIGN PATENT DOCUMENTS

| | | |
|---|---|---|
| JP | 2010048318 A | 3/2010 |
| WO | 2013117369 A1 | 8/2013 |

* cited by examiner

|  | CL1 (31) | CL2 (32) | CL3 (33) | BR1 (21) | BR2 (22) |
|---|---|---|---|---|---|
| 1ST GEAR | O |  |  | O | O |
| 2ND GEAR |  | O |  | O | O |
| 3RD GEAR | O | O |  |  | O |
| 4TH GEAR |  | O | O |  | O |
| 5TH GEAR | O |  | O |  | O |
| 6TH GEAR | O | O | O |  |  |
| 7TH GEAR | O |  | O | O |  |
| 8TH GEAR |  | O | O | O |  |
| REVERSE GEAR |  |  | O | O | O |

FIG. 2

AUTOMATIC TRANSMISSION

BACKGROUND

The present invention relates to an automatic transmission, particularly to an automatic transmission with multiple gear ranges.

Automatic transmissions installed in vehicles (e.g., automobiles) generally include planetary gear sets (planetary gear mechanisms) and a plurality of friction fastening elements, and multiple gear ranges are attained by selectively fastening the friction fastening elements. Recently, multiple gear ranges are provided in transmissions to improve fuel consumption, etc. For example, WO2013/117369A1 (FIGS. 1 to 5) discloses an automatic transmission having eight forward gear ranges by including four planetary gear sets, three clutches, and two brakes.

The planetary gear sets are disposed on an input shaft. Therefore, a dimension of the automatic transmission in its axial direction (the axial length of the automatic transmission) becomes longer as the number of the planetary gear sets increase due to providing multiple gear ranges, which degrades the installability of the transmission in vehicles.

Thus, as disclosed in JP2010-048318A (FIG. 3), it is proposed to coaxially arrange a plurality of clutches in layers in a radial direction of an automatic transmission. In this manner, the axial length of the transmission becomes shorter compared to a case where all the clutches are aligned in the axial direction.

With the automatic transmission in JP2010-048318A, friction plates of two clutches are arranged in layers in the radial direction without overlapping with each other in an axial view of the automatic transmission (i.e., with a gap therebetween in the radial direction). However, although pistons for pushing the friction plates are arranged in layers in the radial direction, they are partially overlapped with each other in the axial view, in other words, they are also aligned in the axial direction. Further, operational hydraulic chambers into which hydraulic pressure for pushing the pistons is supplied, and operational hydraulic passages for supplying the hydraulic pressure into the operational hydraulic chambers are also provided in the axial direction. Therefore, there is a disadvantage that the pistons and the operational hydraulic passages inhibit shortening the axial length of the transmission, and the dimension of the automatic transmission in the axial direction cannot sufficiently be shortened.

SUMMARY

The present invention is made in view of the above situations and aims to provide an automatic transmission, which achieves providing multiple gear ranges while avoiding an increase in a dimension of the automatic transmission in its axial direction by arranging a plurality of clutches compactly in the axial direction.

According to one aspect of the present invention, an automatic transmission including a plurality of clutches coaxially arranged in layers in a radial direction of the automatic transmission is provided. The automatic transmission includes a piston provided to each of the plurality of clutches, the pistons being aligned in the radial direction on a same plane that is perpendicular to an axis of the automatic transmission, without overlapping with each other in an axial view. The automatic transmission includes a common rotational member having a wall, commonly used for the plurality of clutches, and disposed at a predetermined position of the automatic transmission in an axial direction, the wall formed along the plane perpendicular to the axis. The automatic transmission includes a plurality of operational hydraulic passages parallely arranged in the wall of the common rotational member in a circumferential direction of the automatic transmission on the same plane perpendicular to the axis, each of the plurality of operational hydraulic passages communicating with one of operational hydraulic chambers of the respective clutches.

According to this configuration, since the pistons of the plurality of clutches are separated from each other in the radial direction and aligned in the radial direction on the same plane perpendicular to the axis, the pistons do not align in the axial direction. Moreover, since the operational hydraulic passages of the plurality of clutches are formed in the wall of the common rotational member, which is disposed at the predetermined position in the axial direction, so as to align in the circumferential direction, the operational hydraulic passages also do not align in the axial direction. Therefore, the automatic transmission is provided, which is achieved in providing the multiple gear ranges while avoiding an increase in a dimension of the transmission in its axial direction by arranging the plurality of clutches compactly in the axial direction together with the pistons and the operational hydraulic passages.

First parts of the wall of the common rotational member preferably form thin wall parts thinner than second parts, and return springs for biasing the pistons of the clutches to their releasing sides are preferably disposed in the thin wall parts, each of the first parts being positioned between two of the operational hydraulic passages adjacent to each other in the circumferential direction, each of the second parts being formed with one of the operational hydraulic passages.

According to this configuration, since the return springs and the operational hydraulic passages are aligned in the circumferential direction, the return springs and the operational hydraulic passages do not align in the axial direction. Therefore, the plurality of clutches can be arranged compactly in the axial direction together with the return springs.

Each of the return springs is preferably a plate spring.

According to this configuration, since the plate springs that occupy less space than the coil springs in the axial direction are used, the size of the automatic transmission in the axial direction can further be reduced.

The plurality of clutches preferably include three clutches.

According to this configuration, the three clutches are arranged compactly in the axial direction. In other words, by arranging the three clutches into three layers, the axial length of the transmission can further be shortened.

The return springs for the second and third clutches from the inner circumferential side among the three clutches are preferably disposed in the thin wall parts of the common rotational member.

Among the three clutches arranged into three layers, since the second and third clutches on the outer circumferential side have longer circumferential lengths than the first clutch on the inner circumferential side, they have comparatively wide dead spaces in the circumferential direction. Therefore, according to this configuration, by utilizing the circumferentially wide dead spaces, the return springs of the second and third clutches can surely be aligned in the circumferential direction with the operational hydraulic passages.

The return springs and the operational hydraulic passages are preferably alternately disposed in the circumferential direction.

According to this configuration, displacement of the center of gravity of the common rotational member where both kinds of the return springs and the operational hydraulic passages are provided is reduced. Therefore, the common rotational member smoothly rotates without causing vibration, etc. Moreover, according to this configuration, the biasing forces of the return springs respectively suitably act on the pistons. Therefore, the pistons smoothly return to the releasing side without causing difficulty, etc.

Centrifugal balance chambers are preferably aligned, without overlapping each other in the axial view, in the radial direction on the same plane perpendicular to the axis, with each of the centrifugal balance chambers opposing one of the operational hydraulic chambers with one of the pistons of the plurality of clutches interposed therebetween.

According to this configuration, since the centrifugal balance chambers of the plurality of clutches are separated from each other in the radial direction and aligned in the radial direction on the same plane perpendicular to the axis, the centrifugal balance chambers do not align in the axial direction. Therefore, the plurality of clutches can be arranged compactly in the axial direction together with the centrifugal balance chambers.

Friction plates of the plurality of clutches are preferably aligned in the radial direction on the same plane perpendicular to the axis, without overlapping with each other in the axial view.

According to this configuration, since the friction plates of the plurality of clutches are separated from each other in the radial direction and aligned in the radial direction on the same plane perpendicular to the axis, the friction plates do not align in the axial direction. Therefore, the plurality of clutches can be arranged compactly in the axial direction together with the friction plates.

BRIEF DESCRIPTION OF THE DRAWINGS

FIG. 2 is a fastening combination table of friction fastening elements of the automatic transmission.

DETAILED DESCRIPTION OF EMBODIMENTS

Hereinafter, embodiments of the present invention are described in detail with reference to the appended drawings.

(1) Overall Configuration

Figure 1:
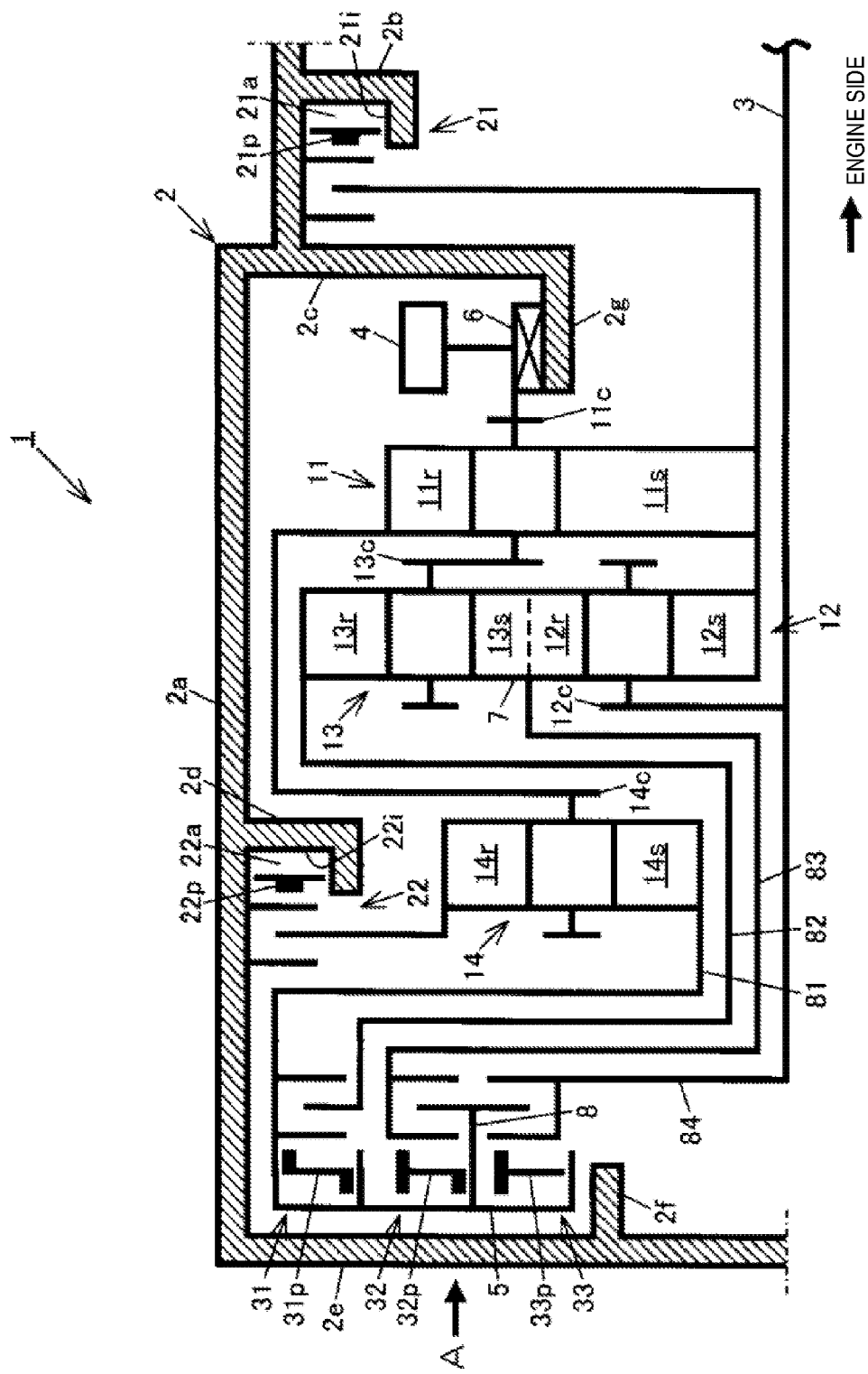
FIG. 1 is a schematic view of an automatic transmission according to an embodiment of the present invention.

FIG. 1 is a substantial view of a configuration of an automatic transmission 1 according to one embodiment of the present invention. The automatic transmission 1 includes an input shaft 3 extending from an engine side, an output gear 4, first to fourth planetary gear sets (hereinafter, referred to as the "PGSs") 11 to 14, first and second brakes 21 and 22, and first to third clutches 31 to 33, which are coaxially disposed in a transmission case 2. The clutches 31 to 33 may have different diameters. In this embodiment, a counter-engine side is one end side of an axial direction of the automatic transmission 1 and the engine side is the other side of the axial direction.

The transmission case 2 has an outer circumferential wall 2a, a first interposing wall 2b provided in an engine-side end part of the outer circumferential wall 2a, a second interposing wall 2c provided on the counter-engine side of the first interposing wall 2b, a third interposing wall 2d provided in an axially middle part of the outer circumferential wall 2a, a side wall 2e provided in a counter-engine side end part of the outer circumferential wall 2a, a boss 2f provided to extend from a middle part of the side wall 2e toward the engine side, and a cylindrical part 2g provided to extend from an inner-circumferential side end part of the second interposing wall 2c toward the counter-engine side.

The four PGSs 11 to 14 are arranged in the following order from the engine side: the first PGS 11, the second PGS 12 on the inner circumferential side, the third PGS 13 on the outer circumferential side, and the fourth PGS 14. The second PGS 12 and the third PGS 13 are arranged in layers in a radial direction of the automatic transmission 1. All of the four PGSs 11 to 14 are a single pinion type in which pinions (not illustrated) supported by carriers 11c to 14c are directly meshed with sun gears 11s to 14s and ring gears 11r to 14r, respectively.

The ring gear 12r of the second PGS 12 and the sun gear 13s of the third PGS 13 arranged into two layers are integrated (as an integrated rotational element 7) by, for example, welding or shrink fitting, so as to be always coupled. The sun gear 11s of the first PGS 11 and the sun gear 12s of the second PGS 12 are always coupled to each other, the ring gear 11r of the first PGS 11 and the carrier 14c of the fourth PGS 14 are always coupled to each other, and the carrier 11c of the first PGS 11 and the carrier 13c of the third PGS 13 are always coupled to each other. The input shaft 3 is always coupled to the carrier 12c of the second PGS 12, and the output gear 4 is always coupled to the carrier 11c of the first PGS 11 and the carrier 13c of the third PGS 13. The output gear 4 is rotatably supported by the cylindrical part 2g of the transmission case 2 via a bearing 6.

The first rotational member 81 is coupled to the sun gear 14s of the fourth PGS 14 and is provided to extend to the counter-engine side. The second rotational member 82 is coupled to the ring gear 13r of the third PGS 13 and is provided to extend to the counter-engine side. The third rotational member 83 is coupled to the integrated rotational element 7 and is provided to extend to the counter-engine side. The fourth rotational member 84 is coupled to the carrier 12c of the second PGS 12 via the input shaft 3.

As for the two brakes 21 and 22, the first brake 21 is disposed at the first interposing wall 2b of the transmission case 2, and the second brake 22 is disposed at the third interposing wall 2d. The first and second brakes 21 and 22 have cylinders 21i and 22i, pistons 21p and 22p fitted into the cylinders 21i and 22i, and operational oil pressure (hydraulic) chambers 21a and 22a formed by the cylinders 21i and 22i and the pistons 21p and 22p, respectively. When oil pressure is supplied into the operational oil pressure chambers 21a and 22a, friction plates of the brakes are fastened, the first brake 21 fixes the sun gear 11s of the first PGS 11 and the sun gear 12s of the second PGS 12 to the transmission case 2, and the second brake 22 fixes the ring gear 14r of the fourth PGS 14 to the transmission case 2.

The three clutches 31 to 33 are disposed in a counter-engine side end section inside the transmission case 2. The three clutches 31 to 33 are arranged in layers in the radial direction, such that the second clutch 32 is on the inner circumferential side of the first clutch 31 and the third clutch 33 is on the inner circumferential side of the second clutch 32 at the same position in the axial direction.

The first clutch 31 disconnects the sun gear 14s of the fourth PGS 14 from the ring gear 13r of the third PGS 13. In other words, the first clutch 31 switches a connection state between the first rotational member 81 coupled to the sun gear 14s and the second rotational member 82 coupled to the ring gear 13r.

The second clutch 32 disconnects the sun gear 14s of the fourth PGS 14 from the integrated rotational element 7 (i.e., the ring gear 12r of the second PGS 12 and the sun gear 13s of the third PGS 13). In other words, the second clutch 32 switches a connection state between the first rotational member 81 coupled to the sun gear 14s and the third rotational member 83 coupled to the integrated rotational element 7.

The third clutch 33 disconnects the sun gear 14s of the fourth PGS 14 from the input shaft 3 and the carrier 12c of the second PGS 12. In other words, the third clutch 33 switches a connection state between the first rotational member 81 coupled to the sun gear 14s and the fourth rotational member 84 coupled to the carrier 12c via the input shaft 3.

In this case, the first rotational member 81 is switched in its connection state with the second rotational member 82 by the first clutch 31, switched in its connection state with the third rotational member 83 by the second clutch 32, and switched in its connection state with the fourth rotational member 84 by the third clutch 33. In other words, the first rotational member 81 is commonly used between two rotational members of which connection states are switched by the clutches 31 to 33. Therefore, a common rotational member 5 having a wall perpendicular to the axis is disposed on the counter-engine side of the first to third clutches 31 to 33 to be close to the counter-engine side wall 2e of the transmission case 2. The common rotational member 5 is coupled to the first rotational member 81. The common rotational member 5 is commonly used for the three clutches 31 to 33, and cylinders, pistons, operational oil pressure chambers, operational oil pressure passages, centrifugal balance chambers, and centrifugal balance chamber components and the like of the respective clutches 31 to 33 are supported by the common rotational member 5.

As described above, the automatic transmission 1 includes the four PGSs 11 to 14, the two brakes 21 and 22, and the three clutches 31 to 33, and as illustrated in the fastening combination table in FIG. 2, by selectively fastening (○ marks) three of five friction fastening elements, first to eighth forward gear ranges and one reverse gear range are achieved. In FIG. 2, CL1 to CL3 indicate the first to third clutches 31 to 33, and BR1 and BR2 indicate the first and second brakes 21 and 22, respectively.

(2) Characteristic Configuration

Figure 3:
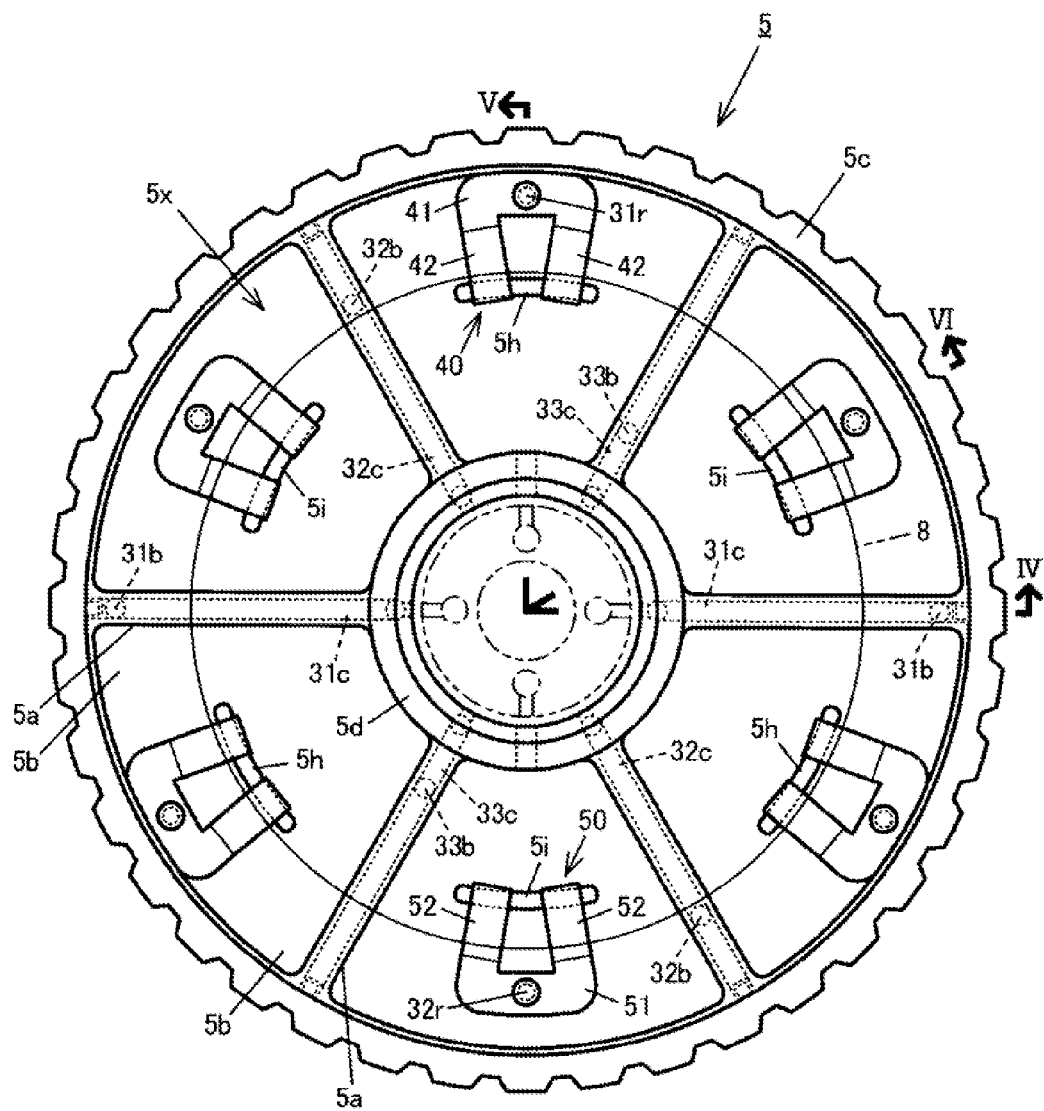
FIG. 3 is a view of a common rotational member provided in the automatic transmission, seen in the direction of the arrow A in FIG. 1.
Figure 4:
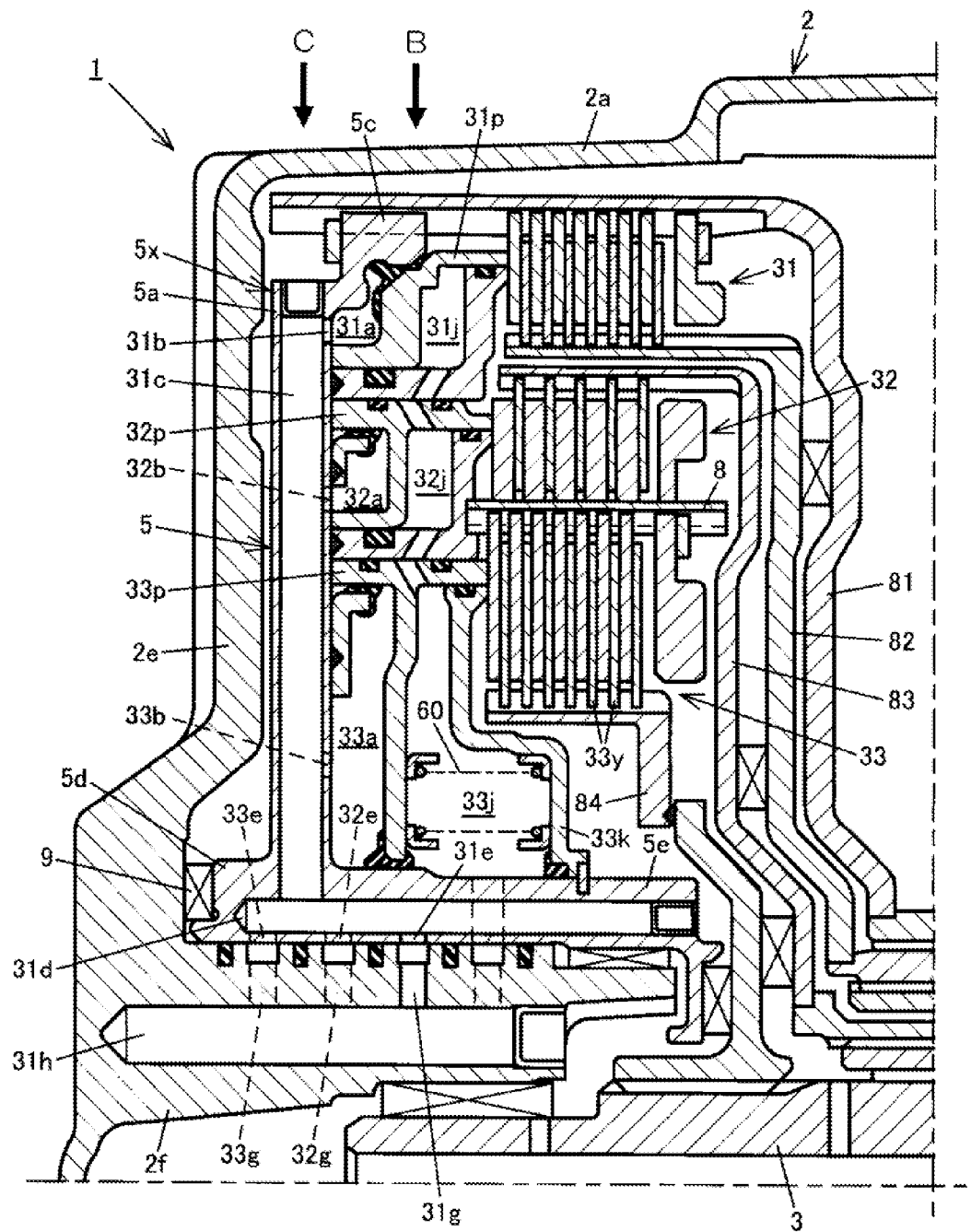
FIG. 4 is a cross-sectional view of a counter-engine side end part of the automatic transmission, taken along the arrow IV in FIG. 3.
Figure 5:
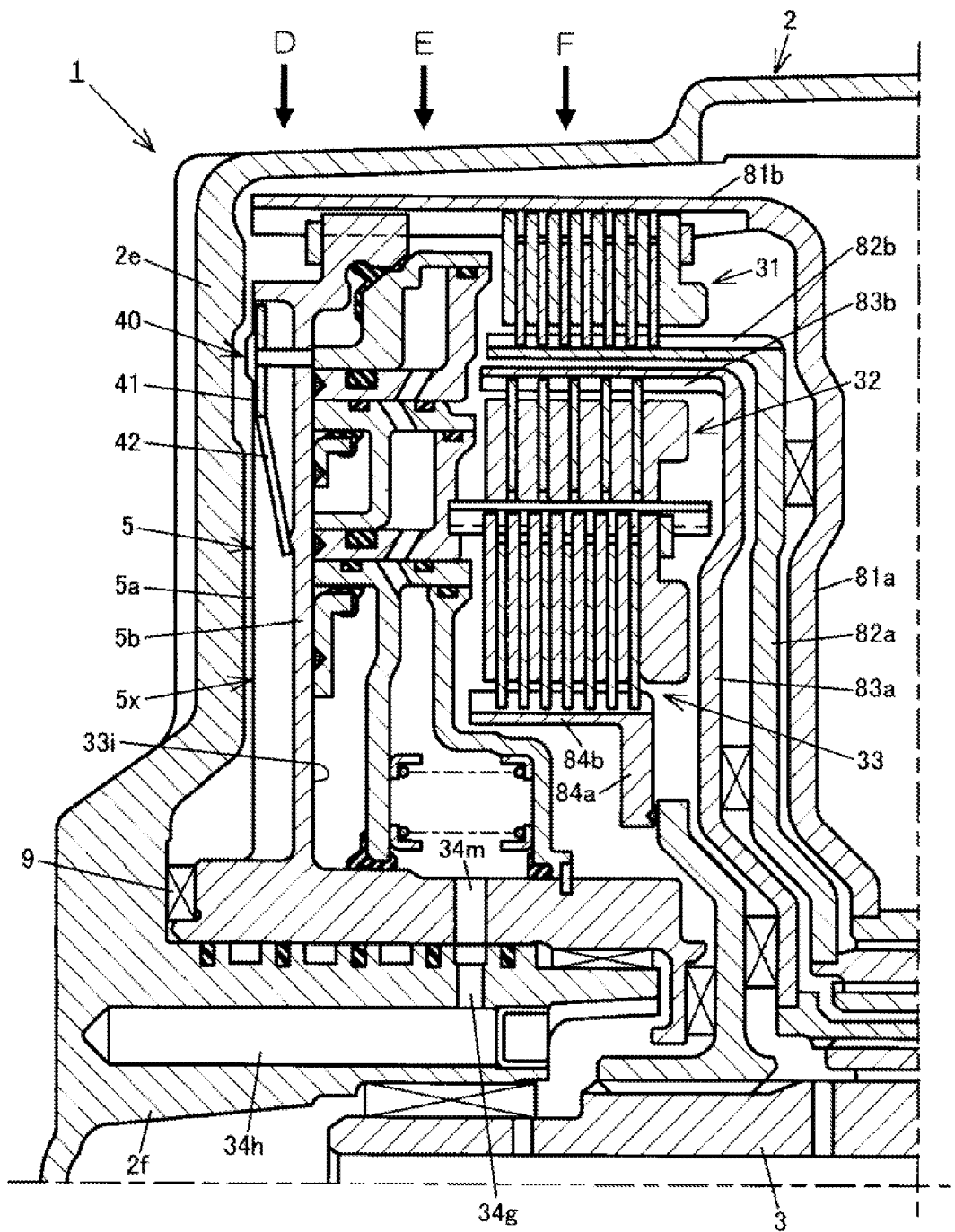
FIG. 5 is a cross-sectional view of the counter-engine side end part of the automatic transmission, taken along the arrow V in FIG. 3.
Figure 6:
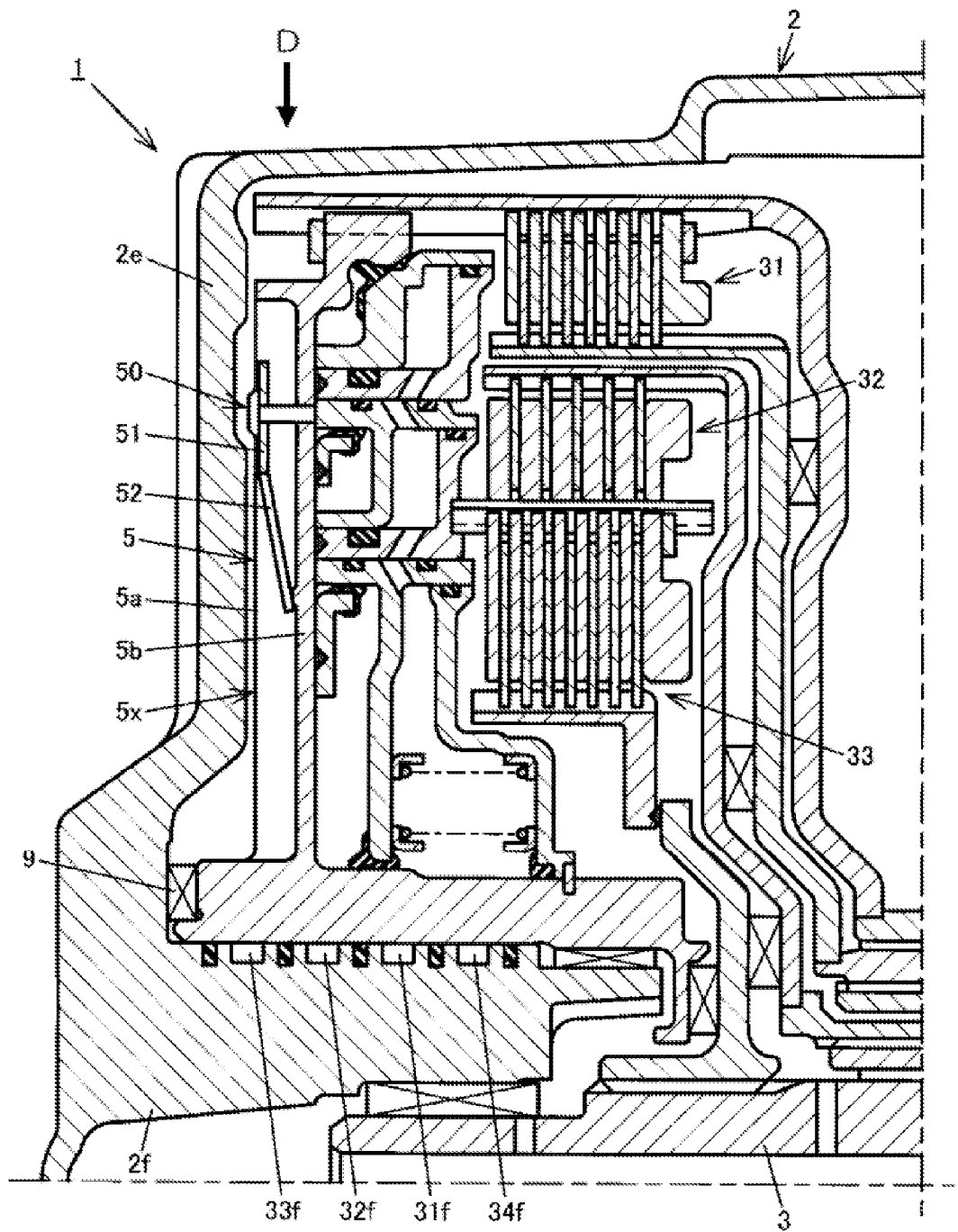
FIG. 6 is a cross-sectional view of the counter-engine side end part of the automatic transmission, taken along the arrow VI in FIG. 3.
Figure 7:
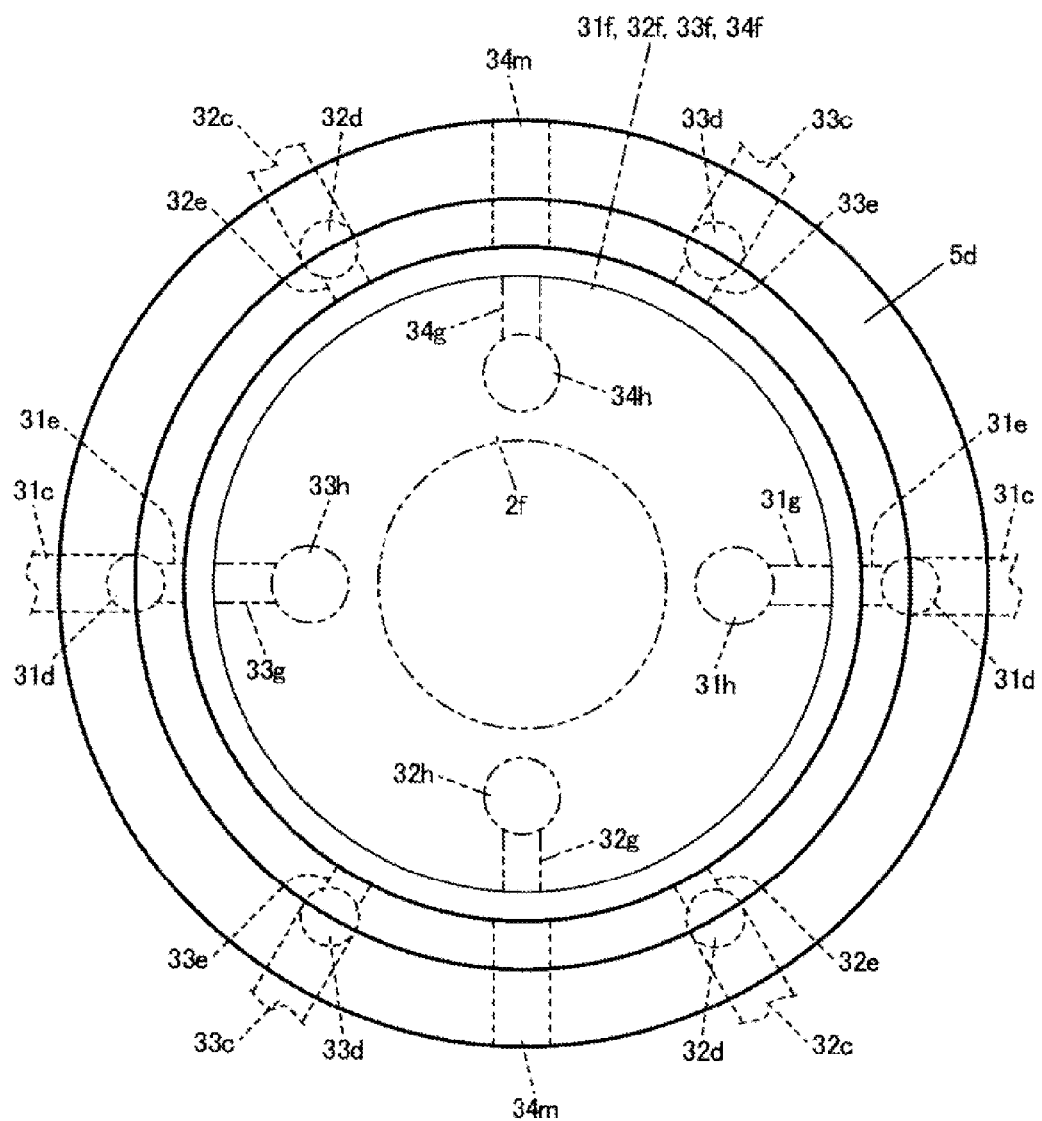
FIG. 7 is an enlarged view of a central part in FIG. 3.
Figure 8:
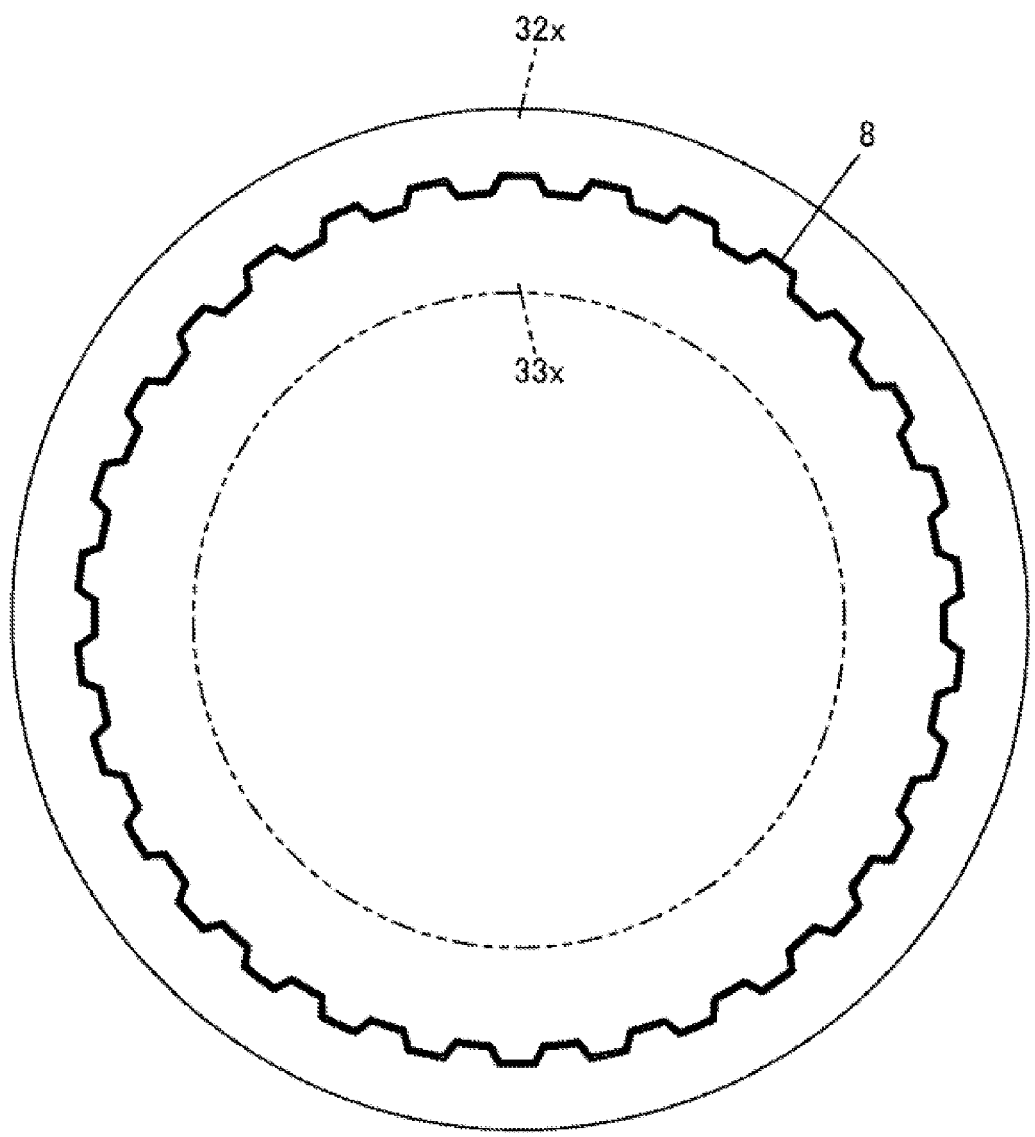
FIG. 8 is a view of a common member provided in the automatic transmission, seen in the direction of the arrow A in FIG. 1.
Figure 9:
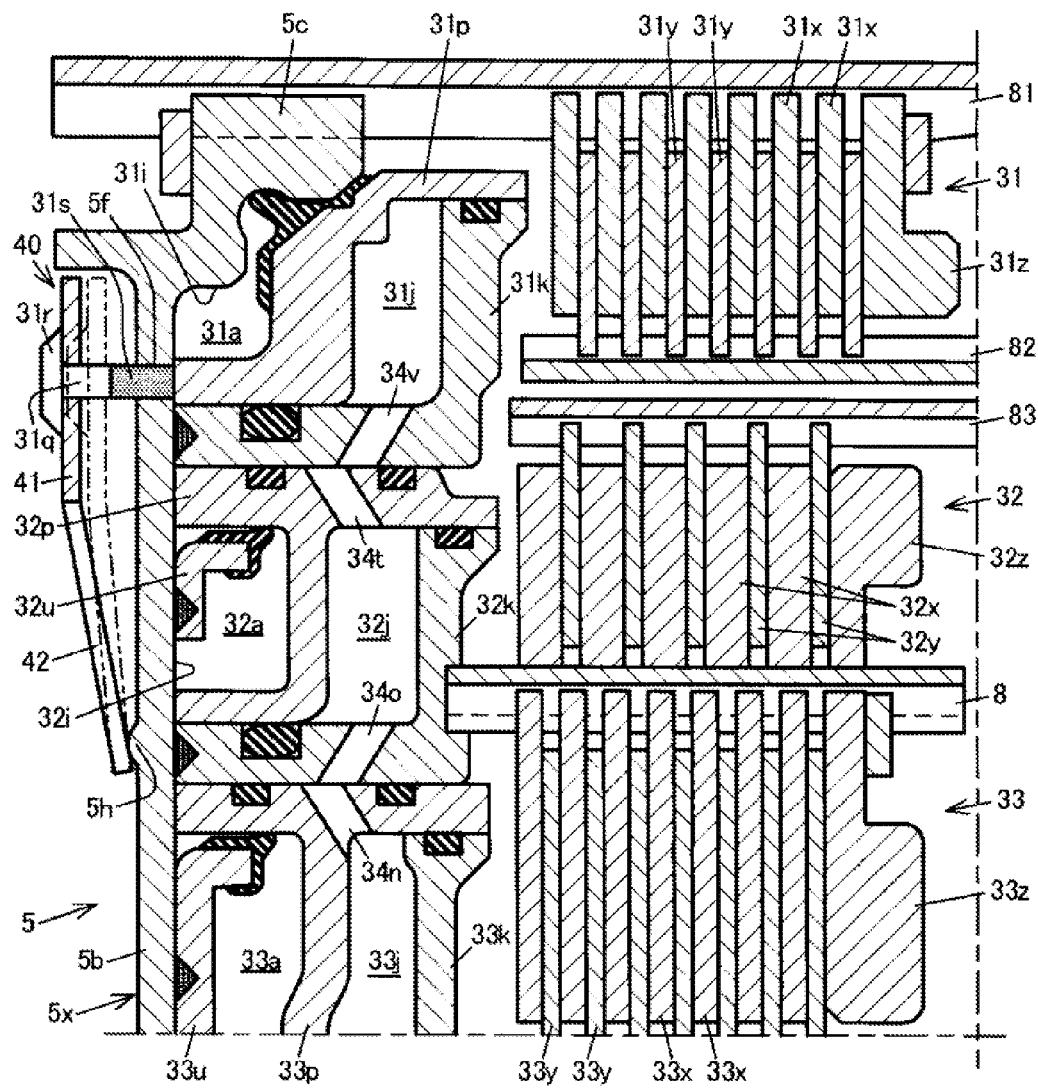
FIG. 9 is an enlarged view of a main part in FIG. 5.
Figure 10:
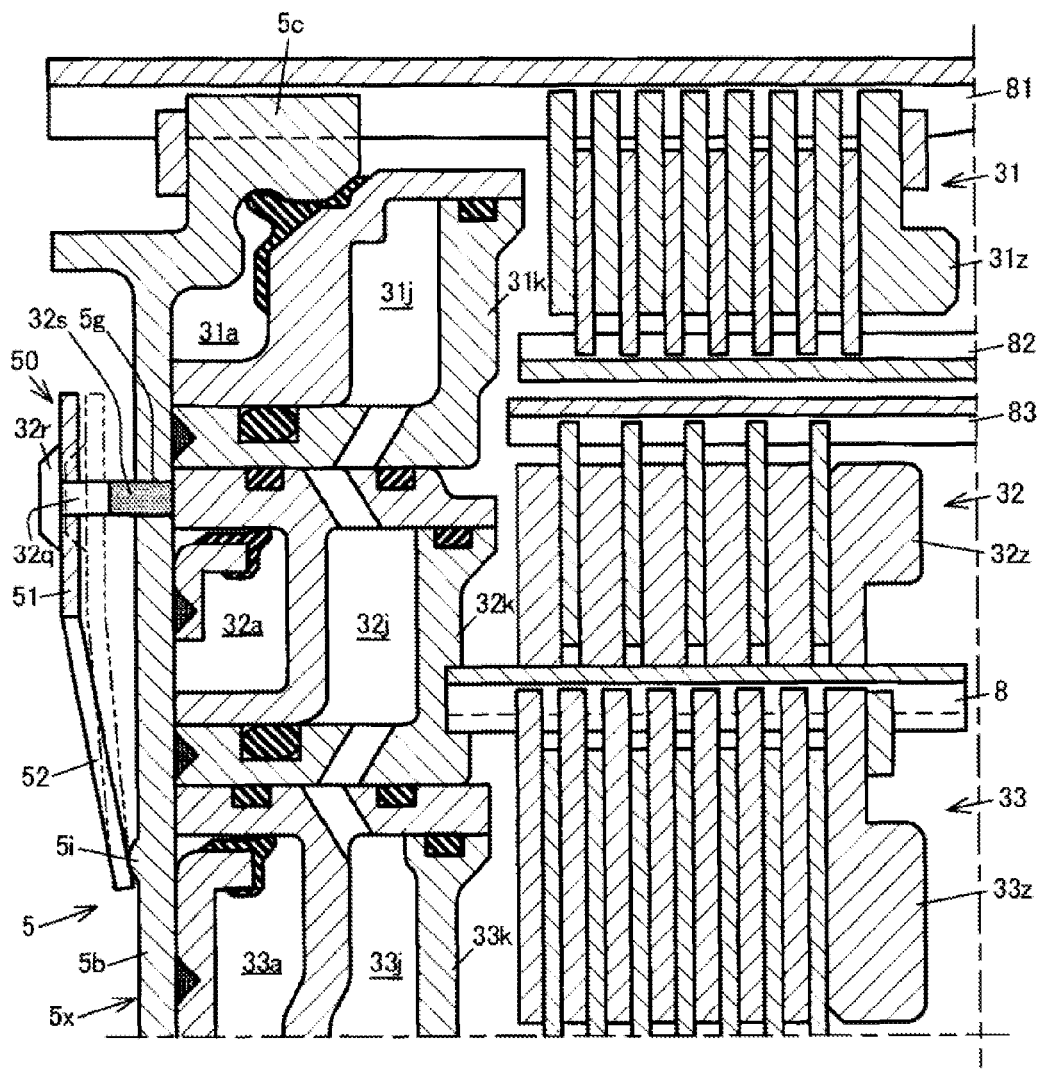
FIG. 10 is an enlarged view of a main part in FIG. 6.

Hereinafter, characteristic parts of this embodiment are described with reference to FIGS. 3 to 10. FIG. 3 is a view of the common rotational member 5 seen in the direction of the arrow A in FIG. 1. FIGS. 4 to 6 are cross-sectional views of the counter-engine side end part of the automatic transmission 1, taken along the arrows IV, V and VI in FIG. 3, respectively. FIG. 7 is an enlarged view of a central part in FIG. 3. FIG. 8 is a view of a common member 8 provided in the automatic transmission 1, seen in the direction of the arrow A in FIG. 1. FIGS. 9 and 10 are enlarged views of main parts in FIGS. 5 and 6, respectively.

As illustrated in FIG. 3, the common rotational member 5 has an annular wall 5x. In an inner circumferential part of the wall 5x (in an edge part of a circular opening formed at the radial center of the wall 5x), as illustrated in FIG. 4, an outer cylindrical part 5d and an inner cylindrical part 5e are formed. The outer cylindrical part 5d is provided to extend from one side surface of the wall 5x perpendicularly thereto, and the inner cylindrical part 5e is longer than the outer cylindrical part 5d and provided to extend from the other side surface of the wall 5x perpendicularly thereto. The outer cylindrical part 5d and the inner cylindrical part 5e are fitted onto the boss 2f of the transmission case 2 so that the outer cylindrical part 5d is relatively on the counter-engine side and the inner cylindrical part 5e is relatively on the engine side. Thus, the common rotational member 5 is rotatably supported by the boss 2f of the transmission case 2. Moreover, a bearing 9 is provided between a counter-engine side end part of the outer cylindrical part 5d and the side wall 2e of the transmission case 2. Thus, the common rotational member 5 is supported by the counter-engine side wall 2e of the transmission case 2 via the bearing 9. Note that a counter-engine side end part of the input shaft 3 is rotatably supported by an inner circumferential surface of the boss 2f.

As illustrated in FIG. 3, the wall 5x has thick wall parts 5a (first parts) and thin wall parts 5b (second parts) in a surface where the outer cylindrical part 5d is formed (counter-engine side surface). The thick wall parts 5a are formed into a square column shape extending from the inner circumferential part to an outer circumferential part of the wall 5x in the radial direction, and are provided at six positions by being arranged radially at even intervals (60° intervals) with respect to the rotational center of the common rotational member 5. Each thin wall part 5b is a fan-shaped part positioned between adjacent thick wall parts 5a and, as illustrated in FIG. 5, is formed by denting the wall 5x from the counter-engine side to the engine side. In other words, in the counter-engine side surface of the wall 5x, the six thick wall parts 5a are aligned in the circumferential direction, and the six thick wall parts 5a and the six thin wall parts 5b are alternately arranged in the circumferential direction.

As illustrated in FIG. 3, a coupling part 5c is formed in the outer circumferential part of the wall 5x. The coupling part 5c is a part where the common rotational member 5 is coupled to the first rotational member 81 by spline engagement. As illustrated in FIG. 4, the coupling part 5c is provided to protrude to the engine side at a position radially outward from the outer circumferential part of the wall 5x.

As illustrated in FIGS. 4 and 9, the three clutches 31 to 33 are disposed on the engine side of the wall 5x, and the common rotational member 5 supports cylinders 31i to 33i (see FIG. 5), pistons 31p to 33p, operational oil pressure chambers 31a to 33a, operational oil pressure passages 31c to 33c (see FIG. 3), centrifugal balance chambers 31j to 33j, centrifugal balance chamber components 31k to 33k of the respective clutches 31 to 33, and the like.

Specifically, as illustrated in FIG. 1, the first rotational member 81 coupled to the sun gear 14s of the fourth PGS 14 is provided to extend to the counter-engine side, then, as illustrated in FIG. 4, curve to extend radially outward (as a radially extending part 81a) at a position before (on the engine side of) the boss 2f of the transmission case 2 or the inner cylindrical part 5e of the common rotational member 5, curve to extend to the counter-engine side of the axial direction again (as an axially extending part 81b) at a position close to the outer circumferential wall 2a of the transmission case 2, and finally extend to a position close to the counter-engine side wall 2e of the transmission case 2. Further, the coupling part 5c of the common rotational member 5 is spline engaged with the axially extending part 81b of the first rotational member 81 so that the common rotational member 5 is coupled to the first rotational member 81.

Here, the radially extending part 81a of the first rotational member 81 has a comparatively large diameter since it extends from near the axis to the first clutch 31 on the outer circumferential side. Moreover, the common rotational member 5 has a comparatively large diameter since it extends from the first clutch 31 on the outer circumferential side to near the axis, and the common rotational member 5 is heavy in weight since it supports the pistons 31p to 33p of the three clutches 31 to 33. Further, the radially extending part 81a of the first rotational member 81 is coupled to the common rotational member 5 (a large diameter part supporting the pistons 31p to 33p) via the coupling part 5c, so as to be integrated with each other. Therefore, since the common rotational member 5 is supported by the counter-engine side wall 2e of the transmission case 2, the part of the first rotational member 81 which covers the first and second clutches 31 and 32 is entirely supported by the side wall 2e along with the common rotational member 5.

The axially extending part 81b of the first rotational member 81 is a drum member for holding friction plates 31x of the first clutch 31 on the first rotational member 81 side (a downstream side of a torque flow from the engine side). Therefore, as illustrated in FIG. 9, the friction plates 31x are held by being spline engaged with the axially extending part 81b of the first rotational member 81. Thus, the rotation of the first rotational member 81 is inputted into the first clutch 31.

As illustrated in FIG. 1, the second rotational member 82 coupled to the ring gear 13r of the third PGS 13 is provided to extend to the counter-engine side on the inner circumferential side of the first rotational member 81 then, as illustrated in FIG. 4, curve to extend radially outward (as a radially extending part 82a) at a position slightly on the counter-engine side of the first rotational member 81, curve to extend to the counter-engine side of the axial direction again (as an axially extending part 82b) at a position on the inner circumferential side of the first rotational member 81, and finally extend to a position on the engine side of the first rotational member 81.

The axially extending part 82b of the second rotational member 82 is a drum member for holding friction plates 31y of the first clutch 31 on the second rotational member 82 side (an upstream side of the torque flow from the engine side). Therefore, as illustrated in FIG. 9, the friction plates 31y are held by being spline engaged with the axially extending part 82b of the second rotational member 82. Thus, the rotation of the second rotational member 82 is inputted into the first clutch 31.

As illustrated in FIG. 1, the third rotational member 83 coupled to the integrated rotational element 7 is provided to extend to the counter-engine side on the inner circumferential side of the second rotational member 82 then, as illustrated in FIG. 4, curve to extend radially outward (as a radially extending part 83a) at a position slightly on the counter-engine side of the second rotational member 82, curve to extend to the counter-engine side of the axial direction again (as an axially extending part 83b) at a position slightly on the inner circumferential side of the second rotational member 82, and finally extend to substantially the same position as the second rotational member 82.

The axially extending part 83b of the third rotational member 83 is a drum member for holding friction plates 32y of the second clutch 32 on the third rotational member 83 side (the upstream side of the torque flow from the engine side). Therefore, as illustrated in FIG. 9, the friction plates 32y are held by being spline engaged with the axially extending part 83b of the third rotational member 83. Thus, the rotation of the third rotational member 83 is inputted into the second clutch 32.

The fourth rotational member 84 coupled to the carrier 12c of the second PGS 12 via the input shaft 3 as illustrated in FIG. 1 extends, as illustrated in FIG. 4, radially outward (as a radially extending part 84a) at a position slightly on the counter-engine side of the third rotational member 83, curves to extend to the counter-engine side of the axial direction again (as an axially extending part 84b) at a position on the inner circumferential side of the third rotational member 83, and finally extends to substantially the same position as the third rotational member 83.

The axially extending part 84b of the fourth rotational member 84 is a drum member for holding friction plates 33y of the third clutch 33 on the fourth rotational member 84 side (the upstream side of the torque flow from the engine side). Therefore, as illustrated in FIG. 4, the friction plates 33y are held by being spline engaged with the axially extending part 84b of the fourth rotational member 84 (see FIG. 9). Thus, the rotation of the fourth rotational member 84 is inputted into the third clutch 33.

Next, as illustrated in FIG. 9, the centrifugal balance chamber component 31k of the first clutch 31 and the centrifugal balance chamber component 32k of the second clutch 32 are provided to an engine side surface of the wall 5x of the common rotational member 5. Each of the components 31k and 32k is formed into an annular member of which radial cross section has an L-shape, extends from the wall 5x to the engine side in the axial direction, and then is coupled at its one end part to the wall 5x by welding or the like so as to extend radially outward. The component 31k of the first clutch 31 has a comparatively large diameter and is disposed on the outer circumferential side of the wall 5x. The component 32k of the second clutch 32 has a comparatively small diameter and is disposed on the inner circumferential side of the component 31k of the first clutch 31.

The piston 31p of the first clutch 31 is axially-movably contained inside a space formed by the component 31k of the first clutch 31, the wall 5x of the common rotational member 5, and the coupling part 5c of the common rotational member 5. The piston 31p is formed into an annular member of which a radial cross section has an S-shape so as to avoid interference with the coupling part 5c. Due to the piston 31p contained inside the space, the operational oil pressure chamber 31a of the first clutch 31 is formed between the piston 31p and the wall 5x, and the centrifugal balance chamber 31j of the first clutch 31 is formed between the piston 31p and the centrifugal balance chamber component 31k. In other words, the operational oil pressure chamber 31a and the centrifugal balance chamber 31j oppose each other with the piston 31p interposed therebetween.

The piston 32p of the second clutch 32 is axially-movably contained inside a space formed by the component 32k of the second clutch 32, the wall 5x of the common rotational member 5, and the component 31k of the first clutch 31. The piston 32p is formed into an annular member of which a radial cross section has an h-shape since it does not have the restriction as the piston 31p of the first clutch 31 has. Due to the piston 32p contained inside the space, the operational oil pressure chamber 32a of the second clutch 32 is formed between the piston 32p and the wall 5x, and the centrifugal balance chamber 32j of the second clutch 32 is formed between the piston 32p and the centrifugal balance chamber component 32k. In other words, the operational oil pressure chamber 32a and the centrifugal balance chamber 32j oppose each other with the piston 32p interposed therebetween. Note that a seal plate 32u for sealing the operational oil pressure chamber 32a of the second clutch 32 to be oil tight is coupled to the wall 5x by welding or the like.

The common member 8 is integrally coupled to an engine side surface of the centrifugal balance chamber component 32k of the second clutch 32. The common member 8 is formed by integrating the drum member holding the friction plates 32x of the second clutch 32 on the first rotational member 81 side (the downstream side of the torque flow from the engine side) with the drum member holding the friction plates 33x of the third clutch 33 on the first rotational member 81 side (the downstream side of the torque flow from the engine side). Therefore, as illustrated in FIG. 8, splines are alternately formed in outer and inner circumferential surfaces of the common member 8, the friction plates 32x of the second clutch 32 are held by being spline engaged with the outer circumferential side of the common member 8, and the friction plates 33x of the third clutch 33 are held by being spline engaged with the inner circumferential side of the common member 8. Thus, the rotation of the first rotational member 81 is inputted into the second and third clutches 32 and 33. Note that the arranged position of the common member 8 is indicated in FIG. 3 by its pitch circle (solid line).

As illustrated in FIG. 4, the centrifugal balance chamber component 33k of the third clutch 33 is provided to the inner cylindrical part 5e of the common rotational member 5. The component 33k is formed into an annular member of which a radial cross section has a crank shape, and is coupled at its one end part to the inner cylindrical part 5e so as to extend radially outward from the inner cylindrical part 5e.

The piston 33p of the third clutch 33 is axially-movably contained inside space formed by the component 33k of the third clutch 33, the wall 5x of the common rotational member 5, the inner cylindrical part 5e of the common rotational member 5, and the component 32k of the second clutch 32 (see FIG. 9). The piston 33p is formed into an annular member of which a radial cross section has a T-shape since it does not have the restriction as the piston 31p of the first clutch 31 has. Due to the piston 33p contained inside the space, the operational oil pressure chamber 33a of the third clutch 33 is formed in the space surrounded by the piston 33p, the wall 5x, and the inner cylindrical part 5e, and the centrifugal balance chamber 33j of the third clutch 33 is formed in a space surrounded by the piston 33p, the centrifugal balance chamber component 33k, and the inner cylindrical part 5e. In other words, the operational oil pressure chamber 33a and the centrifugal balance chamber 33j oppose each other with the piston 33p interposed therebetween. Note that a seal plate 33u for sealing the operational oil pressure chamber 33a of the third clutch 33 to be oil tight is coupled to the wall 5x by welding or the like (see FIG. 9).

As illustrated in FIGS. 4 and 9, the operational oil pressure chambers 31a to 33a and the centrifugal balance chambers 31j to 33j of the clutches 31 to 33 are sealed to be oil tight by, for example, lip seals, O-rings and seal rings which are attached with the pistons 31p to 33p, the centrifugal balance chamber components 31k to 33k, and the seal plates 32u and 33u.

By the above configuration, in this embodiment, as illustrated in FIGS. 4 and 9, the pistons 31p to 33p of the first to third clutches 31 to 33 are aligned in the radial direction on the same plane perpendicular to the axis, without overlapping with each other in the axial view (see the arrow B in FIG. 4).

Moreover, as illustrated in FIGS. 4 and 9, the operational oil pressure chambers 31a to 33a of the first to third clutches 31 to 33 are aligned in the radial direction on the same plane perpendicular to the axis, without overlapping with each other in the axial view.

Moreover, as illustrated in FIGS. 4 and 9, the centrifugal balance chambers 31j to 33j and the centrifugal balance chamber components 31k to 33k of the first to third clutches 31 to 33 are aligned in the radial direction on the same plane perpendicular to the axis, without overlapping with each other in the axial view (see the arrow E in FIG. 5).

Moreover, as illustrated in FIGS. 4 and 9, the friction plates 31x to 33x and 31y to 33y of the first to third clutches 31 to 33 are aligned in the radial direction on the same plane perpendicular to the axis, without overlapping with each other in the axial view (see the arrow F in FIG. 5).

Note that, in FIG. 9, each of the reference numerals 31z, 32z, and 33z indicates a retainer plate. The retainer plate 32z of the second clutch 32 and the retainer plate 33z of the third clutch 33 are assembled with the common member 8 by a single snap ring.

Next, oil paths for supplying oil pressure to the operational oil pressure chambers 31a to 33a of the first to third clutches 31 to 33 are described by using the first clutch 31 as an example.

As illustrated in FIGS. 3 and 4, the operational oil pressure passages 31c extending in the radial direction similarly to the thick wall parts 5a are formed inside the thick wall parts 5a of the wall 5x of the common rotational member 5. An opening 31b communicating with the operational oil pressure chamber 31a is formed at the outer circumferential side of each of the operational oil pressure passages 31c. As illustrated in FIGS. 4 and 7, an inner circumferential end of the operational oil pressure passage 31c communicates with a connecting passage 31d. The connecting passage 31d is formed over the inner cylindrical part 5e and the outer cylindrical part 5d of the common rotational member 5 and extends in the axial direction. A communicating path 31e opening to an inner circumferential surface of the inner cylindrical part 5e is provided at a predetermined axial position of the connecting passage 31d.

At the same axial position as the communicating path 31e, a groove 31f (see FIG. 6) extending in the circumferential direction is formed in an outer circumferential surface of the boss 2f of the transmission case 2. An introducing passage 31g extending radially inward is formed at a predetermined circumferential position of the groove 31f. An inner circumferential end of the introducing passage 31g communicates with a boss passage 31h. The boss passage 31h is formed in a circumferential wall part between the outer and inner circumferential surfaces of the boss 2f and extends in the axial direction.

By the above configuration, when the oil pressure is supplied into the boss passage 31h from an oil pressure circuit (out of range of the illustration), the oil pressure is supplied into the operational oil pressure chamber 31a through the introducing passage 31g and the groove 31f on the transmission case 2 side (see FIG. 6), and the communicating path 31e, the connecting passage 31d, the operational oil pressure passage 31c, and the opening 31b on the common rotational member 5 side. Due to the existence of the groove 31f, the oil pressure is continuously supplied even during the rotation of the common rotational member 5. Further, as illustrated in FIGS. 3 and 7, two sets of the communicating path 31e, the connecting passage 31d, the operational oil pressure passage 31c, and the opening 31b on the common rotational member 5 side are provided point-symmetrically (at a 180° interval) with respect to the rotational center of the common rotational member 5.

The second and third clutches 32 and 33 also have similar configurations. Specifically, the operational oil pressure passage 32c of the second clutch 32 is formed inside the thick wall part 5a which is at a position 60° rightward from the operational oil pressure passage 31c of the first clutch 31 in FIG. 3, and the operational oil pressure passage 33c of the third clutch 33 is formed inside the thick wall part 5a which is at a position 60° rightward from the operational oil pressure passage 32c of the second clutch 32 in FIG. 3. Moreover, as illustrated in FIGS. 3 and 4, an opening 32b of the second clutch 32 is positioned on the inner circumferential side of the opening 31b of the first clutch 31 so as to communicate with the operational oil pressure chamber 32a of the second clutch 32, and an opening 33b of the third clutch 33 is positioned on the inner circumferential side of the opening 32b of the second clutch 32 so as to communicate with the operational oil pressure chamber 33a of the third clutch 33.

On the transmission case 2 side, a boss passage 32h of the second clutch 32 is formed at a position 90° rightward from the boss passage 31h of the first clutch 31 in FIG. 7, and a boss passage 33h of the third clutch 33 is formed at a position 90° rightward from the boss passage 32h of the second clutch 32 in FIG. 7. Moreover, as illustrated in FIGS. 4 and 6, an introducing passage 32g and a groove 32f of the second clutch 32 are positioned on the counter-engine side of the axial direction with respect to the introducing passage 31g and the groove 31f of the first clutch 31, and an introducing passage 33g and a groove 33f of the third clutch 33 are positioned on the counter-engine side of the axial direction with respect to the introducing passage 32g and the groove 32f of the second clutch 32. Further, communicating paths 32e and 33e of the respective second and third clutches 32 and 33 communicating with connecting passages 32d and 33d on the common rotational member 5 side (see FIG. 7) are provided at the same axial position as the grooves 32f and 33f.

By the above configurations, when the oil pressure is supplied into the boss passages 32h and 33h from the oil pressure circuit (out of range of the illustration), the oil pressure is supplied, continuously even during the rotation of the common rotational member 5, to the operational oil pressure chambers 32a and 33a through the introducing passages 32g and 33g, the grooves 32f and 33f, the communicating paths 32e and 33e, the connecting passages 32d and 33d, the operational oil pressure passages 32c and 33c, and the openings 32b and 33b.

Moreover, by the above configurations, in this embodiment, as illustrated in FIGS. 3 and 4, the operational oil pressure passages 31c to 33c communicating with the operational oil pressure chambers 31a to 33a of the first to third clutches 31 to 33 are arranged, parallely in the circumferential direction, in the wall 5x of the common rotational member 5, more specifically, the thick wall part 5a (see the arrow C in FIG. 4).

Next, oil paths for supplying operational oil into the centrifugal balance chambers 31j to 33j of the first to third clutches 31 to 33 are described.

In FIG. 7, a boss passage 34h for the centrifugal balance chamber is formed at a position 90° rightward from the boss passage 33h of the third clutch 33. As illustrated in FIG. 6, the groove 34f for the centrifugal balance chamber is positioned on the engine side of the axial direction with respect to the groove 31f of the first clutch 31, and as illustrated in FIGS. 5 and 7, an introducing passage 34g for the centrifugal balance chamber communicates the boss passage 34h to the groove 34f.

As illustrated in FIG. 5, at the same axial position as the groove 34f, a communicating path 34m is formed in the inner cylindrical part 5e of the common rotational member 5. The communicating path 34m penetrates the inner cylindrical part 5e of the common rotational member 5 from the inner circumferential side to the outer circumferential side, and opens to the centrifugal balance chamber 33j of the third clutch 33 (see FIG. 4). As illustrated in FIG. 7, the communicating path 34m is provided at two positions point-symmetrically (at a 180° interval) with respect to the rotational center of the common rotational member 5.

As illustrated in FIG. 9, a communicating path 34n opening to the centrifugal balance chamber 33j of the third clutch 33 is formed in an upper part of the piston 33p of the third clutch 33, and a communicating path 34o communicating with the communicating path 34n and opening to the centrifugal balance chamber 32j of the second clutch 32 is formed in a lower part of the centrifugal balance chamber component 32k of the second clutch 32. Similarly, a communicating path 34t opening to the centrifugal balance chamber 32j of the second clutch 32 is formed in an upper part of the piston 32p of the second clutch 32, and a communicating path 34v communicating with the communicating path 34t and opening to the centrifugal balance chamber 31j of the first clutch 31 is formed in a lower part of the centrifugal balance chamber component 31k of the first clutch 31.

By the above configuration, when the operational oil is supplied into the boss passage 34h (see FIG. 5) from an operational oil supply source (out of range of the illustration), the operational oil is supplied, by a centrifugal force caused from the rotation of the common rotational member 5, into the centrifugal balance chambers 31j to 33j of the first to third clutches 31 to 33 via the introducing passage 34g, the groove 34f, and the centrifugal balance chamber communicating paths 34m, 34n, 34o, 34t and 34v.

Note that, as illustrated in FIG. 6, five seal rings for sealing the above four grooves 31f to 34f to be oil tight are attached to the outer circumferential surface of the boss 2f of the transmission case 2.

Next, return springs for biasing the pistons 31p to 33p of the first to third clutches 31 to 33 to their releasing sides, respectively, are described.

First, for the first clutch 31, as illustrated in FIGS. 5 and 9, plate springs 40 are used as the return springs. The plate springs 40 are disposed to the thin wall parts 5b of the wall 5x of the common rotational member 5. More specifically, each plate spring 40 is disposed to the outer circumferential side of a counter-engine side surface of the thin wall part 5b, in a circumferentially central portion of one of the thin wall parts 5b. As illustrated in FIG. 3, each plate spring 40 has a flat part 41, and a pair of inclining parts 42 extending in the same direction from both ends of one side of the flat part 41. The plate spring 40 is entirely formed into a channel shape in this embodiment. As illustrated in FIG. 9, the plate spring 40 is arranged such that the flat part 41 is positioned on the outer circumferential side of the inclining part 42 and separated from the thin wall part $5b$, and the inclining part 42 is positioned on the inner circumferential side of the flat part 41 and does not protrude to the counter-engine side from the thick wall part $5a$ (see FIG. 5) in a state where a tip end thereof is engaged with a bulging portion $5h$ formed in the thin wall part $5b$.

As illustrated in FIG. 9, pin-shaped extending parts $31q$ extending to the counter-engine side are provided to a counter-engine side end part of the piston $31p$ of the first clutch 31. Each extending part $31q$ projects to the counter-engine side of the thin wall part $5b$ by being inserted through a penetration hole $5f$ formed in the thin wall part $5b$, and further penetrates the flat part 41 of the plate spring 40. Further, a counter-engine side end portion of the extending part $31q$ is crimped to have a larger diameter (as a crimped portion $31r$), so that the counter-engine side end portion of the extending part $31q$ is locked by the flat part 41.

By the above configuration, the plate springs 40 function as the return springs always biasing the piston $31p$ of the first clutch 31 to the counter-engine side (the releasing side of the first clutch 31) via the extending parts $31q$, respectively. Further, as illustrated in FIG. 3, the plate springs 40 are provided at three positions at even intervals (120° intervals) with respect to the rotational center of the common rotational member 5.

Note that, as illustrated in FIG. 9, a seal member $31s$ for preventing leakage of the oil pressure within the operational oil pressure chamber $31a$ is wound around the portion of each extending part $31q$ inserted through the penetration hole $5f$ of the thin wall part $5b$. Moreover, in FIG. 9, a state wherein the plate spring 40 is elastically deformed when the oil pressure is supplied into the operational oil pressure chamber $31a$ and the piston $31p$ is moved to the fastening side (the engine side) is indicated by a virtual line.

The second clutch 32 has a similar configuration. Specifically, as illustrated in FIGS. 6 and 10, plate springs 50 are used as the return springs for the second clutch 32 as well. As illustrated in FIG. 3, the plate springs 50 are disposed on the inner circumferential side of the plate springs 40 of the first clutch 31. As illustrated in FIG. 10, each plate spring 50 is arranged such that a flat part 51 is positioned on the outer circumferential side of an inclining part 52 and separated from the thin wall part $5b$, and the inclining part 52 is positioned on the inner circumferential side of the flat part 51 and does not protrude to the counter-engine side from the thick wall part $5a$ (see FIG. 6) in a state where a tip end thereof is engaged with a bulging portion $5i$ formed in the thin wall part $5b$.

As illustrated in FIG. 10, pin-shaped extending parts $32q$ extending to the counter-engine side are provided to a counter-engine side end part of the piston $32p$ of the second clutch 32. Each extending part $32q$ projects to the counter-engine side of the thin wall part $5b$ by being inserted through a penetration hole $5g$ formed in the thin wall part $5b$, and penetrates the flat part 51 of the plate spring 50. Further, a counter-engine side end portion of the extending part $32q$ is crimped to have a larger diameter (as a crimped portion $32r$), so that the counter-engine side end portion of the extending part $32q$ is locked by the flat part 51.

By the above configuration, the plate springs 50 function as the return springs always biasing the piston $32p$ of the second clutch 32 to the counter-engine side (the releasing side of the second clutch 32) via the extending parts $32q$, respectively (see FIG. 9). Further, as illustrated in FIG. 3, the plate springs 50 are provided at three positions at even intervals (120° intervals) with respect to the rotational center of the common rotational member 5.

Note that, as illustrated in FIG. 10, a seal member $32s$ for preventing leakage of the operational oil pressure within the transmission case 2 is wound around the portion of each extending part $32q$ inserted through the penetration hole $5g$ of the thin wall part $5b$. Moreover, in FIG. 10, a state where the plate spring 50 is elastically deformed when the oil pressure is supplied into the operational oil pressure chamber $32a$ and the piston $32p$ is moved to the fastening side (the engine side) is indicated by a virtual line.

By the above configuration, in this embodiment, as illustrated in FIGS. 5, 6, 9 and 10, the plate springs 40 and 50 biasing the pistons $31p$ and $32p$ of the first and second clutches 31 and 32 to their releasing sides are arranged to align in the circumferential direction with the operational oil pressure passages $31c$ to $33c$, at the same axial position of the thin wall parts $5b$ of the wall $5x$ of the common rotational member 5 as the operational oil pressure passages $31c$ to $33c$ formed inside the thick wall parts $5a$ (see the arrow D in FIGS. 5 and 6).

Moreover, by the above configurations, in this embodiment, the plate springs 40 and 50 and the operational oil pressure passages $31c$ to $33c$ are alternately arranged in the circumferential direction, as illustrated in FIG. 3.

Moreover, by the above configurations, in this embodiment, although the following description is partially repetition of the above description, as illustrated in FIG. 3, with respect to the rotational center of the common rotational member 5, the thick wall parts $5a$ and thin wall parts $5b$ of the wall $5x$ of the common rotational member 5 are arranged at even intervals, the operational oil pressure passages $31c$ to $33c$ formed inside the thick wall parts $5a$ are arranged at even intervals, the plate springs 40 and the plate springs 50 disposed to the thin wall parts $5b$ are arranged at even intervals, and these various kinds of components are alternately disposed. The operational oil pressure passages $31c$ of the first clutch 31, the operational oil pressure passages $32c$ of the second clutch 32, the operational oil pressure passages $33c$ of the third clutch 33, the plate springs 40 of the first clutch 31, and the plate springs 50 of the second clutch 32 are also arranged similarly with respect to each other.

For the third clutch 33, as illustrated in FIG. 4, coil springs 60 are used as the return springs. As is clear from FIG. 4, the third clutch 33 has axially-long dead space between the friction plates $33x$ and $33y$ (see FIG. 9) and the inner cylindrical part $5e$ in the radial direction. Further, the centrifugal balance chamber component $33k$ of the third clutch 33 is formed into a crank shape in its cross section, corresponding to the shape of the dead space. The coil springs 60 having wide occupying spaces in the axial direction are disposed in a compressed state, in the axially-long centrifugal balance chamber $33j$ which is formed between the piston $33p$ and the centrifugal balance chamber component $33k$. The coil springs 60 are disposed at twelve positions at even intervals (30° intervals) with respect to the rotational center of the common rotational member 5.

(3) Effects

As described above, in this embodiment, in the automatic transmission 1 where the three clutches 31 to 33 are coaxially arranged in layers in the radial direction, the pistons $31p$ to $33p$ of the three clutches 31 to 33 are aligned in the radial direction on the same plane perpendicular to the axis, without overlapping with each other in the axial view (see the arrow B in FIG. 4). Moreover, the common rotational member 5 having the wall 5x formed along the plane, which is perpendicular to the axis, and commonly used for the three clutches 31 to 33 is disposed in the axially-counter-engine side end part. The six operational oil pressure passages 31c to 33c communicating with the operational oil pressure chambers 31a to 33a of the three clutches 31 to 33 are formed to align, in the circumferential direction on the same plane perpendicular to the axis, in the wall 5x of the common rotational member 5, more specifically, the thick wall part 5a (see the arrow C in FIG. 4).

According to this configuration, since the pistons 31p to 33p of the three clutches 31 to 33 are separated from each other in the radial direction and aligned in the radial direction on the same plane perpendicular to the axis, the pistons 31p to 33p do not align in the axial direction. Moreover, since the operational oil pressure passages 31c to 33c of the three clutches 31 to 33 are formed in the wall 5x of the common rotational member 5, which is disposed in the axially-counter-engine side end part, so as to align in the circumferential direction, the operational oil pressure passages 31c to 33c also do not align in the axial direction. Therefore, the automatic transmission 1 achieved in providing the multiple gear ranges while avoiding an increase in a dimension of the transmission 1 in its axial direction by arranging the three clutches 31 to 33 compactly in the axial direction together with the pistons 31p to 33p and the operational oil pressure passages 31c to 33c, is provided.

Additionally, since the three clutches 31 to 33 are arranged compactly in the axial direction, by arranging the three clutches 31 to 33 into three layers, the axial length of the transmission 1 can further be shortened.

In this embodiment, in the wall 5x of the common rotational member 5, the parts which are respectively positioned between two of the operational oil pressure passages 31c to 33c adjacent to each other in the circumferential direction, are the thin wall parts 5b thinner than the parts where the operational oil pressure passages 31c to 33c are formed (i.e., thick wall parts 5a), and the plate springs 40 and 50 biasing the pistons 31p and 32p of the first and second clutches 31 and 32 to the releasing side are disposed in the thin wall part 5b (see the arrows D in FIGS. 5 and 6).

By this configuration, since the plate springs 40 and 50 and the operational oil pressure passages 31c to 33c are aligned in the circumferential direction, the plate springs 40 and 50 and the operational oil pressure passages 31c to 33c do not align in the axial direction. Therefore, the three clutches 31 to 33 can be arranged compactly in the axial direction together with the plate springs 40 and 50.

Moreover, since the occupying space of the plate springs 40 and 50 in the axial direction is smaller than that of the coil springs, the size in the axial direction can further be reduced.

In this embodiment, the plate springs 50 and 40 of the second and first clutches 32 and 31 which are the second and third clutches from the inner circumferential side are disposed in the thin wall parts 5b of the common rotational member 5.

Among the three clutches 31 to 33 arranged into three layers, since the second and third clutches 32 and 31 on the outer circumferential side have longer circumferential lengths than the first layer clutch 33 on the inner circumferential side, they have comparatively wider dead spaces in the circumferential direction in the wall 5x of the common rotational member 5, particularly in the thin wall parts 5b (see FIG. 3). Therefore, according to this configuration, by utilizing the circumferentially wide dead space, the plate springs 50 and 40 of the second and third layer clutches 32 and 31 can surely be aligned in the circumferential direction with the operational oil pressure passages 31c to 33c.

In this embodiment, the plate springs 40 and 50 and the operational oil pressure passages 31c to 33c are alternately disposed in the circumferential direction (see FIG. 3).

According to this configuration, displacement of the center of gravity of the common rotational member 5 where both kinds of the plate springs 40 and 50 and the operational oil pressure passages 31c to 33c are provided is reduced. Therefore, the common rotational member 5 smoothly rotates without causing vibration, etc. Moreover, according to this configuration, the biasing forces of the plate springs 40 and 50 suitably act on the pistons 31p and 32p. Therefore, the pistons 31p and 32p smoothly return to the releasing side without causing difficulty, etc.

In this embodiment, with respect to the rotational center of the common rotational member 5, the thick wall parts 5a and the thin wall parts 5b of the wall 5x of the common rotational member 5 are arranged at even intervals, the operational oil pressure passages 31c to 33c formed inside the thick wall parts 5a (even by only looking at each kind among the operational oil pressure passage 31c of the first clutch 31, the operational oil pressure passage 32c of the second clutch 32, and the operational oil pressure passage 33c of the third clutch 33) are arranged at even intervals, and the plate springs 40 and 50 disposed to the thin wall parts 5b (even by only looking at each kind between the plate spring 40 of the first clutch 31 and the plate spring 50 of the second clutch 32) are arranged at even intervals, and these various kinds of components are alternately disposed (see FIG. 3).

According to this configuration, even though the various parts and members are mixedly supported by the common rotational member 5, the displacement of the center of gravity of the common rotational member 5 is reduced. Therefore, the common rotational member 5 smoothly rotates without causing vibration, etc. Moreover, according to this configuration, the fastening oil pressure which pushes the pistons 31p to 33p when fastening the clutches 31 to 33 suitably acts on each of the pistons 31p to 33p. Therefore, the pistons 31p to 33p smoothly move to the fastening side without causing difficulty, etc.

In this embodiment, the centrifugal balance chambers 31j to 33j opposing to the operational oil pressure chambers 31a to 33a with the pistons 31p to 33p of the three clutches 31 to 33 interposed therebetween, respectively, are aligned in the radial direction on the same plane perpendicular to the axis, without overlapping with each other in the axial view (see the arrow E in FIG. 5).

According to this configuration, since the centrifugal balance chambers 31j to 33j of the three clutches 31 to 33 are separated from each other in the radial direction and aligned in the radial direction on the same plane perpendicular to the axis, the centrifugal balance chambers 31j to 33j do not align in the axial direction. Therefore, the three clutches 31 to 33 can be arranged compactly in the axial direction together with the centrifugal balance chambers 31j to 33j.

In this embodiment, the friction plates 31x to 33x and 31y to 33y of the three clutches 31 to 33 are aligned in the radial direction on the same plane perpendicular to the axis, without overlapping with each other in the axial view (see the arrow F in FIG. 5).

According to this configuration, since the friction plates 31x to 33x and 31y to 33y of the three clutches 31 to 33 are separated from each other in the radial direction and aligned in the radial direction on the same plane perpendicular to the axis, the friction plates 31x to 33x and 31y to 33y do not align in the axial direction. Therefore, the three clutches 31 to 33 can be arranged compactly in the axial direction together with the friction plates 31x to 33x and 31y to 33y.

In this embodiment, the drum member holding the friction plate 32x of the second clutch 32 on the first rotational member 81 side is integrated with the drum member holding the friction plate 33x of the third clutch 33 on the first rotational member 81 side, as the common member 8.

According to this configuration, compared to the case where the drum members are separately provided, the dimension of the transmission 1 in the radial direction can be shortened.

(4) Modifications

Figure 11:
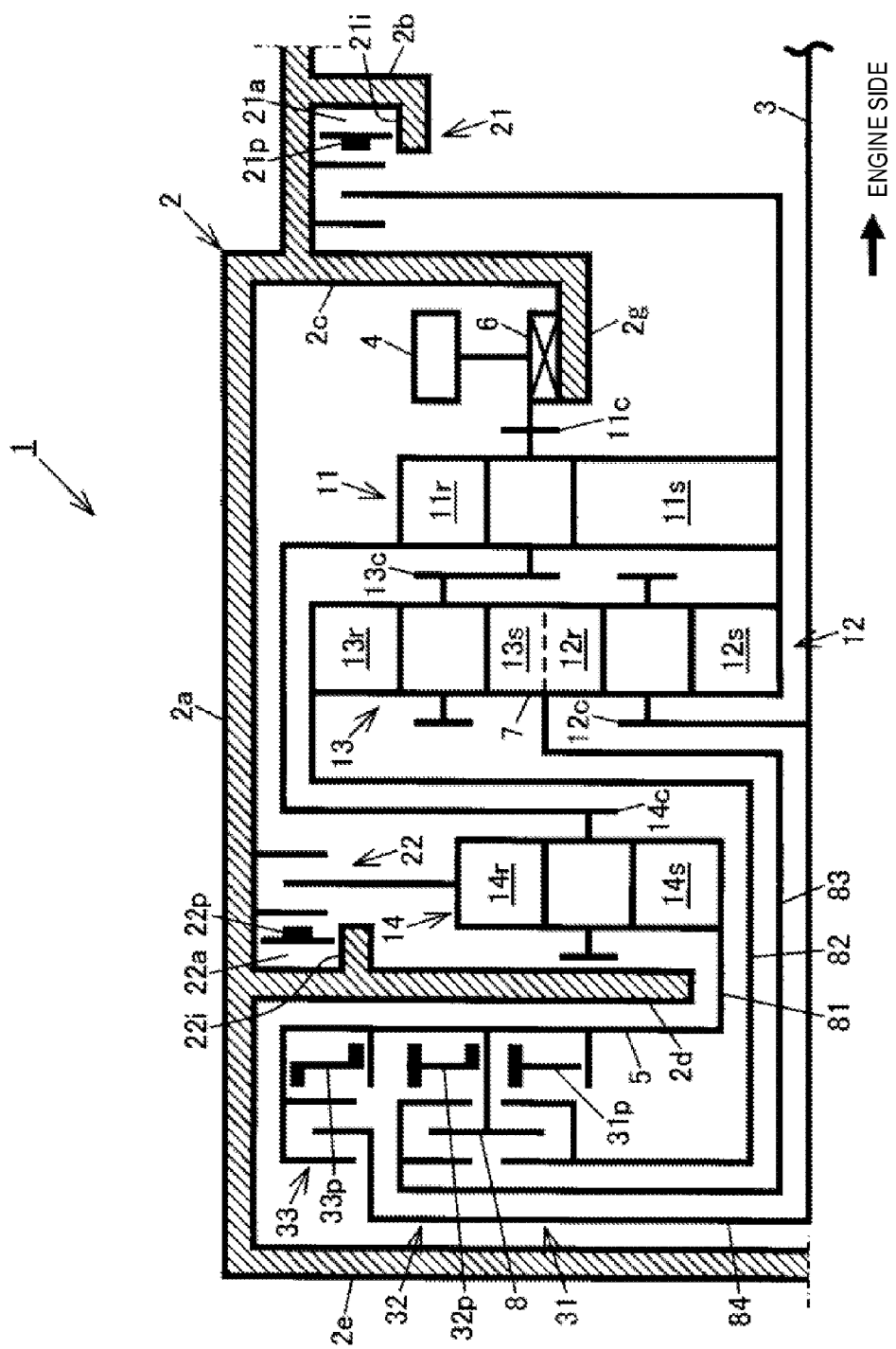
FIG. 11 is a schematic view of an automatic transmission according to another embodiment of the present invention.

In this embodiment, the common rotational member 5 is disposed in the axial end part (particularly in the counter-engine side end part) of the transmission 1; however, without being limited in this manner, the common rotational member 5 may be disposed in an axial middle part of the transmission 1 (on the engine side of the first to third clutches 31 to 33). One example of arrangement of this case is illustrated in FIG. 11. The substantial difference from FIG. 1 is as follows.

Firstly, the pistons 31p to 33p are supported by the counter-engine side of the common rotational member 5.

Secondly, the third interposing wall 2d is provided to extend circumferentially inward, and the common rotational member 5 is supported by the third interposing wall 2d.

Thirdly, the second to fourth rotational members 82 to 84 curve radially outward on the counter-engine side of the pistons 31p to 33p.

Fourthly, the first clutch 31 for switching the connection state between the first rotational member 81 and the second rotational member 82 is positioned innermost in the radial direction among the clutches 31 to 33, the second clutch 32 for switching the connection state between the first rotational member 81 and the third rotational member 83 is positioned radially outward of clutch 31, and the third clutch 33 for switching the connection state between the first rotational member 81 and the fourth rotational member 84 is positioned outermost in the radial direction.

In this embodiment, the drum members of the two clutches 32 and 33 on the inner circumferential side among the three clutches 31 to 33 are integrated; however, alternatively, the drum members of the two clutches 31 and 32 on the outer circumferential side may be integrated. Moreover, they may be separated without integrating the drum members.

In this embodiment, for example, in FIG. 1, the input shaft 3 extends rightward, and the rightward side is the engine side; however, without being limited in this manner, the input shaft 3 may extend leftward, and the leftward side may be the engine side.

In this embodiment, the first rotational member 81 is the rotational member on the downstream side with respect to the torque flow from the engine side, and the second to fourth rotational members 82 to 84 are the rotational members on the upstream side; however, without being limited in this manner, for example, the first rotational member 81 may be the rotational member on the upstream side and the second to fourth rotational members 82 to 84 may be the rotational members on the downstream side.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Automatic Transmission
5 Common Rotational Member
5x Wall
5a Thick Wall Part
5b Thin Wall Part
31 to 33 First to Third Clutches
31a to 33a Operational Oil Pressure Chamber
31c to 33c Operational Oil Pressure Passage
31j to 33j Centrifugal Balance Chamber
31p to 33p Piston
31x to 33x Friction Plate on First Rotational Member Side
31y to 33y Friction Plate on Second to Fourth Rotational Members Side
40, 50 Plate Spring (Return Spring)

What is claimed is:

1. An automatic transmission including a plurality of clutches coaxially arranged in layers in a radial direction of the automatic transmission, comprising:
 a piston provided to each of the plurality of clutches, the pistons being aligned in the radial direction on a same first plane that is perpendicular to an axis of the automatic transmission, without overlapping with each other radially;
 a common rotational member having a wall, commonly used for the plurality of clutches, and disposed at a predetermined position of the automatic transmission in an axial direction, the wall formed along a second plane perpendicular to the axis; and
 a plurality of operational hydraulic passages arranged in the wall of the common rotational member spaced in a circumferential direction of the automatic transmission on the same second plane perpendicular to the axis, each of the plurality of operational hydraulic passages communicating with a respective operational hydraulic chamber of the respective clutches, the hydraulic passages arranged in the second plane separate from the first plane where the pistons are aligned,
 wherein first parts of the wall of the common rotational member form thin wall parts thinner than second parts, and return springs for biasing the pistons of the clutches to their releasing sides are disposed in the thin wall parts, each of the first parts being positioned between two of the operational hydraulic passages adjacent to each other in the circumferential direction, and each of the second parts being formed with one of the operational hydraulic passages; and
 wherein a subset of the return springs comprises plate springs provided on an opposite side of the common rotational member from the pistons.

2. The automatic transmission of claim 1, wherein the plurality of clutches includes three clutches.

3. The automatic transmission of claim 2, wherein the return springs for second and third clutches from an inner circumferential side among the three clutches are disposed in the thin wall parts of the common rotational member.

4. The automatic transmission of claim 3, wherein the return springs and the operational hydraulic passages are alternately disposed in the circumferential direction.

5. The automatic transmission of claim 1, wherein centrifugal balance chambers are aligned, without overlapping with each other radially, in the radial direction on a plane perpendicular to the axis, each of the centrifugal balance chambers opposing one of the operational hydraulic chambers with one of the pistons of the plurality of clutches interposed therebetween.

6. The automatic transmission of claim 1, wherein friction plates of the plurality of clutches are aligned in the radial direction on a plane perpendicular to the axis, without overlapping with each other radially.

* * * * *